(12) United States Patent
Iwaji et al.

(10) Patent No.: US 11,273,712 B2
(45) Date of Patent: Mar. 15, 2022

(54) AC ELECTRIC MOTOR CONTROL DEVICE

(71) Applicant: Hitachi Industrial Equipment Systems Co., Ltd., Tokyo (JP)

(72) Inventors: Yoshitaka Iwaji, Tokyo (JP); Kazuaki Tobari, Tokyo (JP); Yuuta Iwase, Tokyo (JP); Yusaku Onuma, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 324 days.

(21) Appl. No.: 16/479,852

(22) PCT Filed: Feb. 13, 2018

(86) PCT No.: PCT/JP2018/004765
§ 371 (c)(1),
(2) Date: Jul. 22, 2019

(87) PCT Pub. No.: WO2018/159274
PCT Pub. Date: Sep. 7, 2018

(65) Prior Publication Data
US 2021/0328537 A1    Oct. 21, 2021

(30) Foreign Application Priority Data
Feb. 28, 2017    (JP) .............................. JP2017-035670

(51) Int. Cl.
*H02P 21/16* (2016.01)
*H02P 29/024* (2016.01)
(Continued)

(52) U.S. Cl.
CPC ................ *B60L 3/00* (2013.01); *H02P 21/16* (2016.02); *H02P 21/22* (2016.02); *H02P 27/08* (2013.01);
(Continued)

(58) Field of Classification Search
CPC ........ H02P 29/024; H02P 21/22; H02P 27/08; H02P 21/16; H02P 8/36; H02P 8/38; H02M 7/53871
See application file for complete search history.

(56) References Cited

U.S. PATENT DOCUMENTS

2003/0071588 A1    4/2003  Iwaji et al.
2008/0030163 A1*   2/2008  Fukuchi .................. H02P 21/22
                                                            318/801
(Continued)

FOREIGN PATENT DOCUMENTS

JP          1-308187 A    12/1989
JP          9-294390 A    11/1997
(Continued)

OTHER PUBLICATIONS

International Search Report (PCT/ISA/210) issued in PCT Application No. PCT/JP2018/004765 dated May 22, 2018 with English translation (two (2) pages).
(Continued)

*Primary Examiner* — Bickey Dhakal
(74) *Attorney, Agent, or Firm* — Crowell & Moring LLP

(57) ABSTRACT

Provided is an AC electric motor control device capable of detecting, in an AC electric motor drive device, abnormal operation of an AC electric motor or abnormal operation due to, for example, a sudden change of a load without an erroneous operation regardless of the operational state of the AC electric motor. When driving a three-phase AC electric motor by an inverter, inside a controller, an electric motor constant is calculated using at least one of the current, voltage, and rotational speed of the electric motor and the variation of the constant value is analyzed, thereby detecting abnormal operation of the electric motor or abnormal operation of a load device connected to the electric motor. In order to analyze the constant, a variation to be determined to be
(Continued)

abnormal is preset or an abnormal value is calculated in comparison with the accumulated values of past constant changes. Alternatively, only the variation of the constant calculated in the controller is extracted to detect abnormality.

10 Claims, 13 Drawing Sheets

(51) Int. Cl.
  *B60L 3/00* (2019.01)
  *H02P 21/22* (2016.01)
  *H02P 27/08* (2006.01)
  *B60L 15/20* (2006.01)
  *H02M 7/5387* (2007.01)

(52) U.S. Cl.
  CPC ............. *H02P 29/024* (2013.01); *B60L 15/20* (2013.01); *H02M 7/53871* (2013.01)

(56) References Cited

U.S. PATENT DOCUMENTS

| | | | | |
|---|---|---|---|---|
| 2009/0309530 | A1* | 12/2009 | Shin | G01R 31/343 318/490 |
| 2009/0322262 | A1* | 12/2009 | Tobari | H02P 21/18 318/400.02 |
| 2011/0043150 | A1* | 2/2011 | Ogawa | H02M 5/458 318/400.26 |
| 2013/0213123 | A1 | 8/2013 | Ghoneim | |
| 2014/0077738 | A1* | 3/2014 | Iwaji | H02P 21/04 318/400.36 |

FOREIGN PATENT DOCUMENTS

| | | |
|---|---|---|
| JP | 2001-25282 A | 1/2001 |
| JP | 2003-79200 A | 3/2003 |
| JP | 2003-164188 A | 6/2003 |
| JP | 2005-110335 A | 4/2005 |
| JP | 2007-6613 A | 1/2007 |
| JP | 2008-043134 A | 2/2008 |
| JP | 2012-075293 A | 4/2012 |
| JP | 20213-121204 A | 6/2013 |
| WO | WO 2012/043116 A1 | 4/2012 |

OTHER PUBLICATIONS

Japanese-language Written Opinion (PCT/ISA/237) issued in PCT Application No. PCT/JP2018/004765 dated May 22, 2018 (three (3) pages).
European Examination on Report issued in European Application No. 18761204.9 dated Dec. 22, 2021 (six (6) pages).

\* cited by examiner

FIG. 3
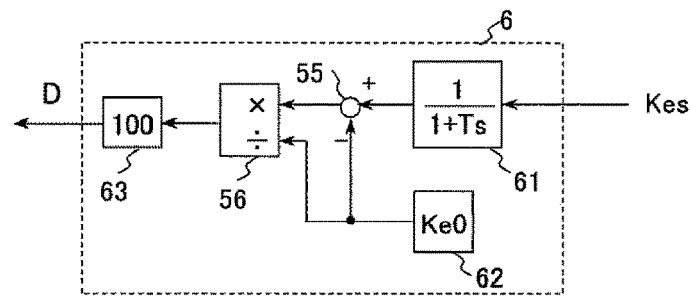
FIG. 4
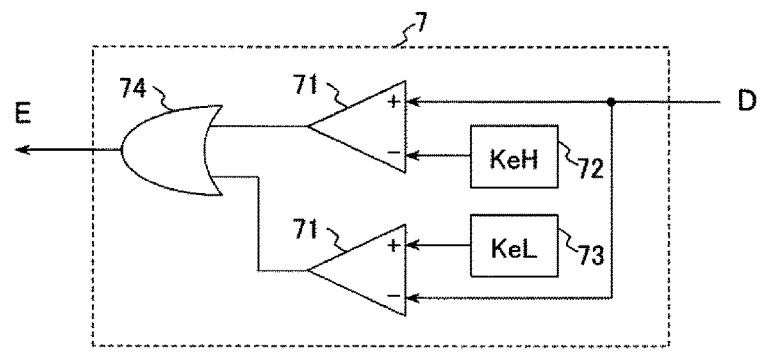
FIG. 5A  ROTATIONAL SPEED ωr
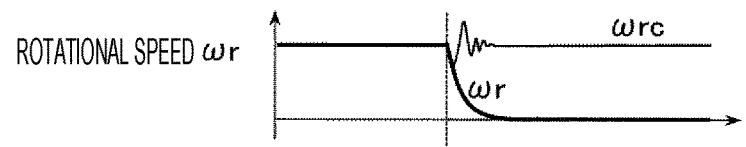
FIG. 5B  CURRENT I1
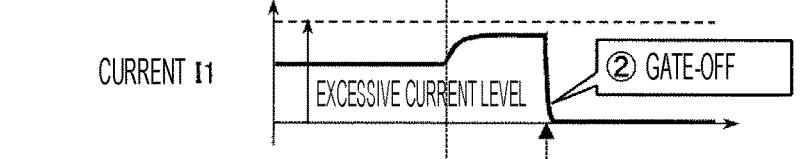
FIG. 5C  Kes
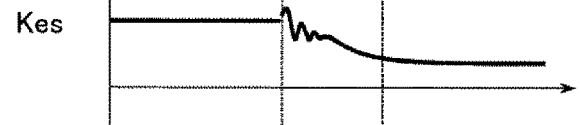
FIG. 5D  ABNORMALITY SIGNAL D
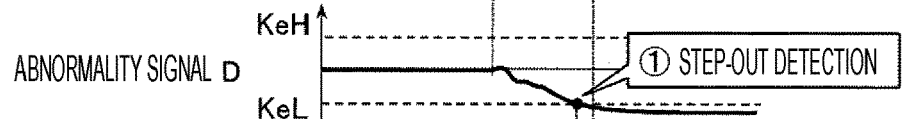
FIG. 5E  GATE-OFF SIGNAL E
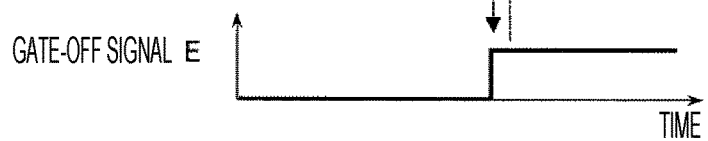

FIG. 13A
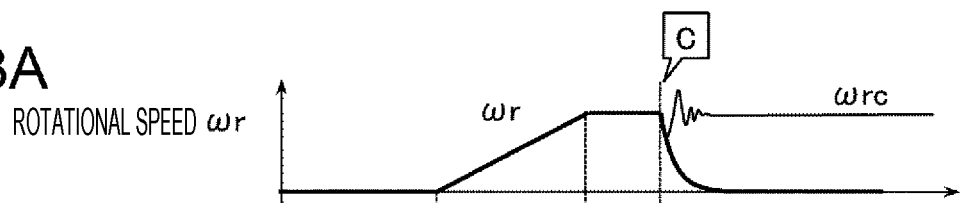
ROTATIONAL SPEED ωr
FIG. 13B    D
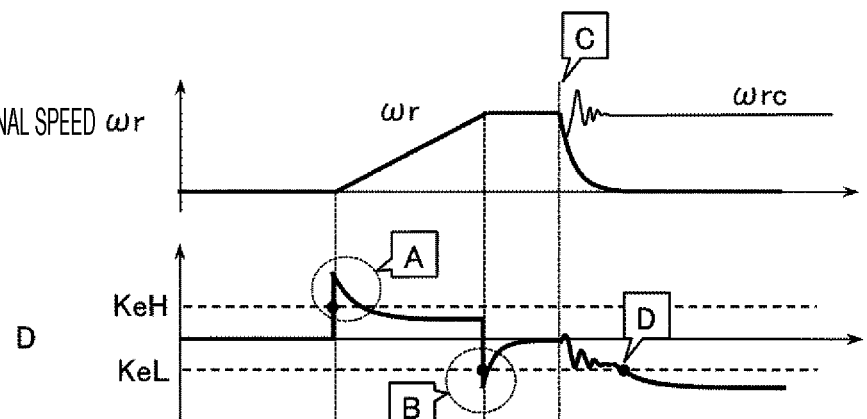
FIG. 13C    D*
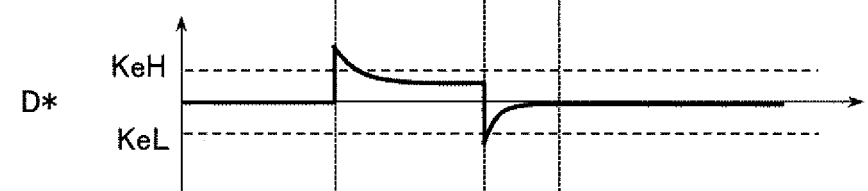
FIG. 13D    D'
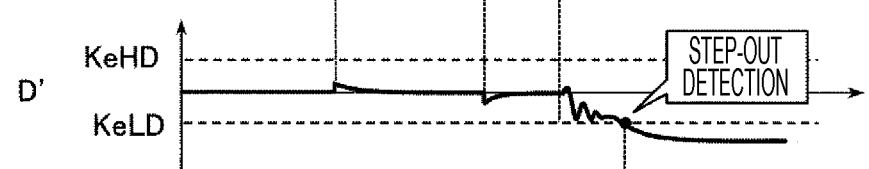
FIG. 13E
GATE-OFF SIGNAL E
TIME

AC ELECTRIC MOTOR CONTROL DEVICE

TECHNICAL FIELD

The present invention relates to a three-phase alternating current (AC) electric motor drive device, and an electric motor drive technology applied to a machine tool, a pump, a fan, a conveyor, an elevator, an electric vehicle, and the like which use the three-phase AC electric motor, and more particularly, to a technology of detecting abnormal operation.

BACKGROUND ART

An alternating current (AC) electric motor has been used in various fields such as home appliances, industries, vehicles, railways, and the like. In recent years, a sensorless control, which enables a rotational speed control or a torque control without directly detecting a rotational speed and a rotation position angle of an electric motor by using a sensor, has come into wide use. The use of the sensorless control enables avoidance of a failure risk of the sensor, such that it is possible to largely improve reliability.

However, since there is no sensor, it is difficult to detect an abnormal operation such as step-out of the AC electric motor, abnormality of a device due to an excessive load, and the like. Further, there has been a demand to detect signs of the abnormalities in advance and prevent a damage caused by the abnormal operation.

PTL 1 proposes a technology in which a motor constant is back-calculated to estimate an operation temperature of a motor and detect an abnormality in temperature.

In addition, PTLs 2 to 5 have already proposed a method of detecting a "step-out phenomenon" as an abnormal state of an electric motor.

In PTL 2, whether or not step-out occurs is determined by calculating an effective value of a current flowing through an electric motor and a power factor. By using a fact that the effective value of the current of the electric motor is increased and a fact that the power factor is decreased at the time of step-out, a reference value is set for the effective value of the current, and in a case where the power factor is equal to or less than a predetermined value, it is determined that the step-out occurs.

In PTL 3, a current of an electric motor is detected and coordinate conversion thereof with respect to a rotation coordinate axis is performed, and whether or not step-out occurs is determined on the basis of an intensity of an exciting current. Further, a property in which an exciting current component is increased is used at the time of step-out.

PTL 4 proposes that an axial error calculation value at the time of sensorless control is performed, or that step-out is detected by using reactive power or active power. The former uses a phenomenon in which axis deviation becomes severe at the time of step-out, and the later uses a phenomenon in which reactive power is increased at the time of step-out.

CITATION LIST

Patent Literature

PTL 1: JP 2007-6613 A
PTL 2: JP H09-294390 A
PTL 3: JP 2001-25282 A
PTL 4: JP 2003-79200 A

SUMMARY OF INVENTION

Technical Problem

According to PTL 1, a motor constant value is calculated, but abnormal operation such as step-out cannot be detected. Further, the calculated constant value varies even at the time of transition in a normal operation range such as variation of a load, such that an error occurs in a temperature estimation value. In addition, in a case where partial demagnetization occurs, it is difficult to detect the occurrence of the partial demagnetization.

In detection of step-out described in PTLs 2 to 4, step-out is detected by using a current value, a phase, a power factor, reactive power, or the like. Therefore, misdetection easily occurs in a condition that the power factor is decreased as an operational state of an electric motor, which is problematic. Particularly, in a "weak magnetic field region" of a permanent magnet motor in which a permanent magnet is attached to a rotor, a power factor at the time of no load is close to zero, and a current value tends to be increased. In this state, for example, in a case where a power supply voltage is decreased, the power factor is further decreased and the current value is also increased, and thus it is often determined that the "step-out" occurs.

Further, at the time of starting with the sensorless control, the starting is performed by open driving by intentionally flowing a reactive current in most cases, and even in this case, it is difficult to detect step-out.

In addition, in a case where it is desired to enhance speed responsiveness or toque responsiveness, a transient current is increased consequentially, such that a power factor is remarkably decreased or axis deviation occurs depending on conditions. There is a possibility that even such an operation is misdetected as "step-out" when using a conventional method.

Solution to Problem

When driving a three-phase AC electric motor by an inverter, inside a controller, an electric motor constant is calculated using at least one of the current, voltage, and rotational speed of the electric motor and the variation of the constant value is analyzed, thereby detecting abnormal operation of the electric motor or abnormal operation of a load device connected to the electric motor. In order to analyze the constant, a variation to be determined to be abnormal is preset or an abnormal value is calculated in comparison with the accumulated values of past constant changes. Alternatively, only the variation of the constant calculated in the controller is extracted to detect an abnormality.

Advantageous Effects of Invention

Effects obtained by a representative invention of inventions disclosed in the present application will be briefly described as follows.

According to the present invention, it is possible to detect an abnormal operation such as step-out or demagnetization, and a sign of abnormality thereof with high precision. In particular, abnormality detection precision is improved in a weak magnetic field region in which a power factor is low and a current value is increased, or when open driving at the time of starting is performed, thereby improving reliability of an electric motor system. Further, it is possible to prevent damage such as destruction of a device due to a failure, or the like.

BRIEF DESCRIPTION OF DRAWINGS

FIG. 3 is a view illustrating a configuration of an analyzer according to the first embodiment.

FIG. 4 is a view illustrating a configuration of an abnormality detector according to the first embodiment.

FIGS. 5A to 5E are waveform views for describing an operation waveform of each component according to the first embodiment.

FIGS. 13A to 13E are waveform views for describing an operation waveform of each component according to the fourth embodiment.

DESCRIPTION OF EMBODIMENTS

Figure 1:
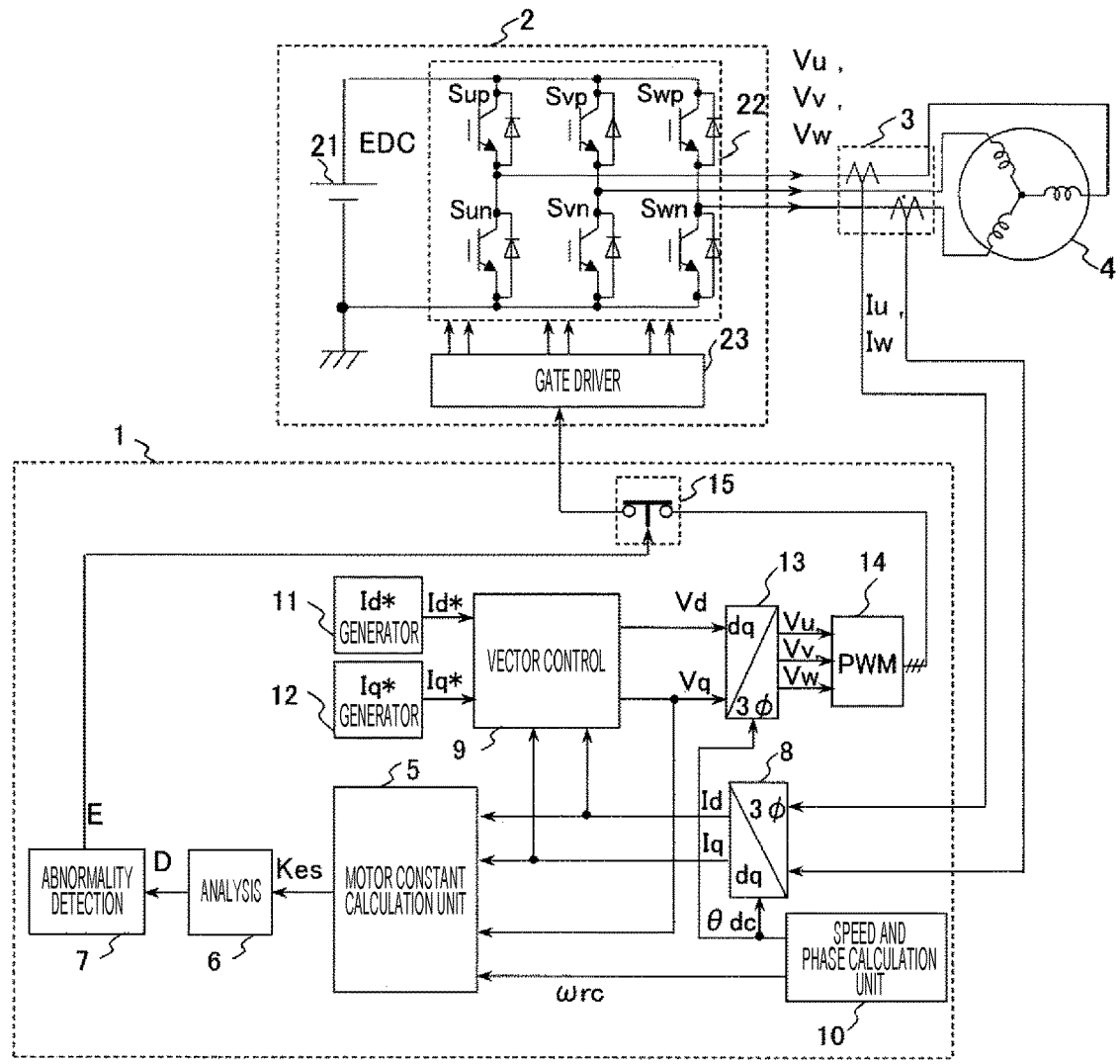
FIG. 1 is a view illustrating an alternating current (AC) electric motor control device according to a first embodiment.

Hereinafter, embodiments of the present invention will be described with reference to the drawings.

First Embodiment

An alternating current (AC) electric motor control device according to a first embodiment of the present invention will be described with reference to FIGS. 1 to 5.

An object of the device is to drive a three-phase permanent magnet synchronous motor 4 (hereinafter, simply referred to as a PM motor 4), and the device is configured to largely include a controller 1 controlling the PM motor 4, an inverter 2 consisting of a power supply 21, an inverter main circuit 22, and a gate driver 23 driving the inverter main circuit, a current detector 3 detecting a phase current of the PM motor 4, and the PM motor 4 as a driving target.

Further, as the driving target, the PM motor is exemplified in the present embodiment. However, the driving target may be another kind of AC electric motor.

The controller 1 is a controller performing a vector control of the PM motor 4, and includes a motor constant calculation unit 5 as a characteristic part of the present invention, an analyzer 6 which analyzes a calculated motor constant value, and an abnormality detector 7 which determines abnormality of the device on the basis of an analysis result. Other components of the controller 1 implement a vector control of driving of a general AC electric motor, and consist of a dq converter 8 which converts alternating currents Iu and Iw into values Id and Iq of a dq coordinate axis as a rotor coordinate axis of the PM motor 4, a vector controller 9 which controls an exciting current component Id and a vector current component Iq, a speed and position calculation unit 10 which calculates a rotation speed and a rotation position angle of the PM motor 4, an Id* generator 11 and an Iq* generator 12 which impart Id* and Iq*, which are command values, with respect to Id and Iq, respectively, a dq inverter 13 which converts voltage commands Vd and Vq on a dq coordinate as an output from the vector controller 9 into three-phase AC voltage command Vu, Vv, and Vw, a pulse width modulator (PWM) 14 which generates a gate pulse signal for driving the inverter 2 on the basis of Vu, Vv, and Vw, and a gate interrupter 15 which interrupts a gate pulse signal of the inverter 2 for protection when abnormality occurs during the driving of the PM motor 4.

Further, the Id* generator 11 is a control block generating an exciting current command of the PM motor 4, and changes a command value depending on a torque or a rotational speed. The Iq* generator 12 is a control block generating a torque current command Iq* of the PM motor 4, and corresponds to a higher level controller of the vector controller 9. For example, the Iq* generator 12 functions as a speed controller which controls a rotational speed of the PM motor 4, or a block which calculates a necessary torque current command on the basis of a state of a load device such as a pump and transmits the torque current command to the vector controller 9.

The components denoted by reference numerals 8 to 14 in the controller 1 are portions for implementing a control of a torque or a rotational speed of the PM motor 4, and constitute a vector control system. In the present embodiment, the components implement a sensorless vector control in which a rotor position or a rotational speed of the PM motor 4 is not directly detected. Instead of the sensor, the speed/phase calculation unit 10 performs estimation calculation of a rotor position θd or a rotational speed ωr of the PM motor 4, and outputs a rotor position estimation value θdc or a rotational speed estimation value ωrc as an estimation result. Various methods for the speed/phase calculation unit 10 have been proposed, and thus a description thereof will be omitted herein.

Next, the motor constant calculation unit 5, the analyzer 6, and the abnormality detector 7, which are characteristic parts of the present invention, will be described.

In a case of performing a vector control of the PM motor 4, in general, a current of the PM motor 4 is controlled on the dq coordinate axis as described in the description of the controller 1. In this case, a voltage equation of the PM motor 4 on the dq coordinate axis is as represented by Equations (1) and (2).

[Math 1]
$$V_d = L_d \frac{d}{dt} I_d + R_1 I_d - \omega_1 L_q I_q \quad \text{Equation (1)}$$

[Math 2]
$$V_q = L_q \frac{d}{dt} I_q + R_1 I_q + \omega_1 L_d I_d + \omega_1 K_e \quad \text{Equation (2)}$$

In Equations above, R1, Ld, Lq, and Ke are motor constants, in which R1 represents a winding resistance value, Ke represents a power generation constant, Ld represents a d-axis inductance, and Lq represents a q-axis inductance. Further, ω1 indicates a primary angular frequency (electric angular frequency) of an alternating current applied to the PM motor 4.

Among these motor constants, a term (that is, ω1·Ke) of an induced voltage in Equation (2) is most affected in a case where abnormality in speed occurs in a motor or a load device. The primary angular frequency ω1 has a relationship with the speed estimation value ωrc estimated in the speed and position calculation unit 10 as represented by the following Equation

[Math 3]
$$\omega_1 = \frac{P}{2} \omega_{rc} \quad \text{Equation (3)}$$

and thus, the induced voltage ω1·Ke is most affected in a case where variation of the speed occurs. However, in a case of the sensorless control, an actual rotational speed ωr cannot be directly observed, and thus a change of the speed cannot be detected depending on conditions. This is because performance of the sensorless control is poor. However, an estimation response time of the speed is limited with the current sensorless technology. Therefore, abnormality in speed cannot be detected in some cases such as a case where a speed is rapidly changed. As a result, even when step-out of the PM motor 4 occurs and the PM motor 4 completely stops, there is a possibility that power is continuously supplied to the motor without noticing that the step-out of the PM motor 4 occurs and the PM motor 4 completely stops. An excessive current flow through the motor, an insulating property deteriorates due to heat, and mechanical vibration is caused by the step-out, which is problematic.

The "step-out detection" method already proposed by the conventional technology uses the fact that the term of the induced voltage (ω1·Ke) in Equation (2) becomes zero at the time of step-out. As a rotational speed becomes zero due to the step-out, the term of the induced voltage becomes zero, and an AC voltage is applied only to a winding of the motor. As a result, a current with a large amplitude and a low power factor flows. By using this phenomenon, in the conventional method, the step-out is detected by observing an amplitude value and a power-factor angle of a current, an intensity of an exciting current, reactive power, or the like.

However, these methods have a big problem. A "weak magnetic field" control is performed when the PM motor 4 is driven at a high speed in some cases. The "weak magnetic field" is a technology of canceling an induced voltage (ω1·Ke) generated due to the high-speed driving by intentionally flowing an exciting current to the negative side (which is referred to as a weak magnetic field current) when the induced voltage exceeds an output limit of the inverter. The weak magnetic field current is a current for canceling a magnetic flux of the PM motor 4, and thus does not consume energy and acts as a reactive current. As a result, the power factor is decreased.

In addition, when a direct current (DC) voltage of the inverter is changed due to variation of a power supply voltage or the like, there is a need to change the weak magnetic field current accordingly, and a reactive current component simultaneously varies.

In the conventional method, there is a possibility that misdetection of the "step-out" occurs when the weak magnetic field control is performed. Further, when a step-out detection level is set to be high in consideration of the weak magnetic field current, there is a possibility that real step-out cannot be detected, and thus it is difficult to adjust the step-out detection level.

Further, in a general sensorless control, the open driving is often introduced at the time of starting, and in this case, there is a need to stabilize the motor by flowing a large amount of reactive current. Even under this condition, the power factor is also decreased, and it is difficult to adjust the step-out detection level.

In order to solve the above described problems, in this present invention, a motor constant is calculated in real time and the calculated value is monitored, thereby detecting abnormality of a motor or a load device.

When a power generation constant Ke is back-calculated in Equation (2), a relationship as below is obtained.

[Math 4]
$$K_{es} = \frac{V_q - \omega_1 L_d I_d - R_1 I_q}{\omega_1} \quad \text{Equation (4)}$$

Further, a derivative term in Equation (2) is ignored.

ω1, which is a denominator of the right-hand side in Equation (4), is obtained on the basis of the speed estimation value ωrc, and in a case where a difference occurs between ωrc and an actual speed ωr, a calculation value Kes of the power generation constant is calculated to be largely different from the original constant Ke. The power generation constant Ke is a permanent magnetic flux itself and varies by several % to a dozen or so % depending on a temperature. However, a variation of 50% or more never occurs in a general situation. Therefore, an occurrence of an abnormality in rotational speed can be detected by observing Kes. In Equation (4), a q-axis voltage Vq actually applied to the PM motor 4, detection currents Id and Iq, a motor constant Ld, and R1 are used for calculation. However, Ld or R1 hardly largely varies, and thus a difference between the actual speed and the estimation speed can be detected as a change of Ke by Equation (4).

Figure 2:
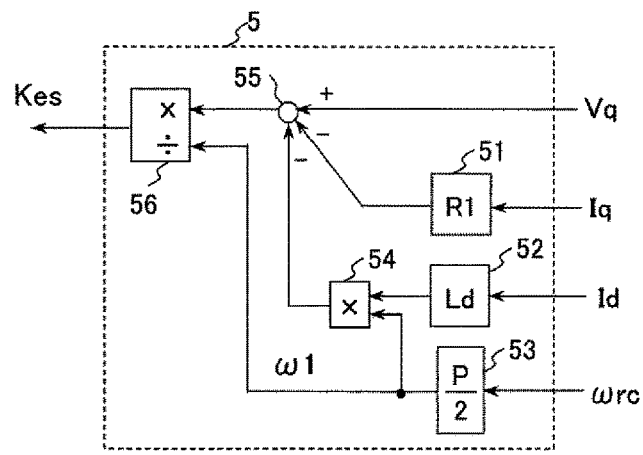
FIG. 2 is a view illustrating a motor constant calculation unit according to the first embodiment.

FIG. 2 illustrates a configuration block of the motor constant calculation unit 5. The motor constant calculation unit 5 consists of a winding resistance R1 setter 51, a d-axis inductance Ld setter 52, a motor pole pair number setter 53, a multiplier 54, an adder 55, and a divider 56. The motor constant calculation unit 5 calculates the power generation constant Kes on the basis of a q-axis voltage command Vq, a d-axis current detection value Id, a q-axis current detection value Iq, and the speed estimation value ωrc by using Equations (3) and (4).

FIG. 3 is a configuration block diagram of the analyzer which modifies Kes calculated by the motor constant calculation unit 5 to a value which can be used to determine an occurrence of an abnormality. The analyzer 6 is constituted by a filter 61, a Ke0 setter 62 which imparts a reference value Ke0 of the power generation constant Ke, an adder 55, a divider 56, and a gain 63. An excessive component is eliminated from Kes obtained by the motor constant calculation unit 5 through the filter 61 for cutting noise or excessive variation, and then variation with respect to Ke0 as a reference value is converted into a percentage (Equation (5)).

[Math 5]

$$D = 100 \times \frac{K_{es} - K_{e0}}{K_{e0}} \qquad \text{Equation (5)}$$

FIG. 4 is a configuration block diagram of the abnormality detector 7. The abnormality detector 7 consists of a comparator 71 which compares magnitudes of two inputs, an abnormality determination upper limit setter 72 which sets KeH as an abnormality upper limit value of constant variation, an abnormality determination lower limit setter 73 which sets an abnormality lower limit value, and an OR circuit 74 which calculates OR of an input signal. The abnormality detector 7 sets an upper limit value KeH and a lower limit value KeL for an abnormality signal D obtained in Equation (5), and the comparator 71 compares the respective limit values with a value of the abnormality signal D. If a signal of "+" of the input is larger than a signal input to "−", the comparator 71 outputs "1", and if not, the comparator 71 outputs "0". When reaching any one of the upper limit value and the lower limit value, a gate-off signal E is generated by the OR circuit 74 to cut a gate pulse to the inverter 2, thereby protecting the device.

These operations will be described with reference to FIG. 5.

A case where a rotational speed of the motor is suddenly decreased due to an abnormal operation such as a sudden change of a load when the PM motor 4 rotates at a predetermined rotational speed ωr is assumed. In this case, the motor cannot follow the rapid change of the speed and actually stops; however, the speed estimation value ωrc still has the value of "ωrc" which is the rotational speed before the motor stop.

A motor current is increased as illustrated in FIG. 5(b), but an excessive current does not flow in a case where a change in speed is sharp, and the step-out cannot be detected. According to the present invention, in the controller 1, the power generation constant is back-calculated, and is output as Kes (see FIG. 5(c)). The abnormality signal D is calculated by the analyzer 6 on the basis of the value of Kes, and the abnormality detector 7 detects an abnormality, determines that the step-out occurs, and outputs the gate-off signal E (see FIG. 5(e)) for stopping the inverter 2.

As described above, according to the present invention, it is possible to certainly detect step-out of the motor or a sudden change of a load from the abnormality of the motor constant to stop the inverter even when the PM motor 4 is in a low power factor state such as a weak magnetic field or the like.

Further, although the PM motor is exemplified in the description, application to an induction motor is also possible. In a case of an induction machine, a secondary magnetic flux Φ2d(=M·d) corresponds to the power generation constant Ke, and thus a constant M can be obtained by dividing the secondary magnetic flux by Id. The step-out can be detected similarly to the case of the PM motor by observing variation of the value of M.

Second Embodiment

Next, an AC electric motor control device according to a second embodiment of the present invention will be described with reference to FIGS. 6 and 7.

Figure 6:
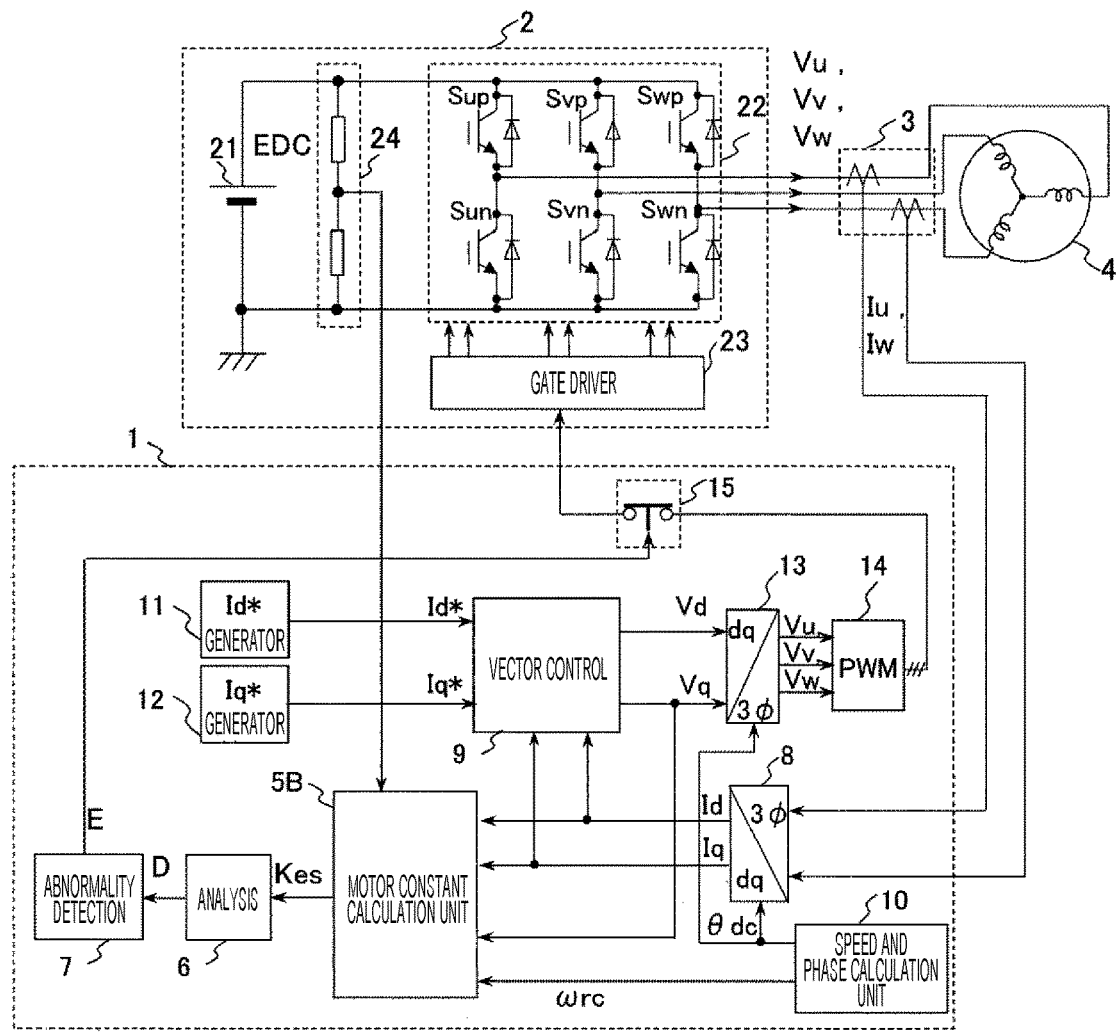
FIG. 6 is a view illustrating a configuration of an AC electric motor control device according to a second embodiment.

FIG. 6 is a configuration block diagram according to the second embodiment. FIG. 6 illustrates a configuration in which a power supply voltage detector 24 is newly added to an inverter 2 in comparison to the configuration diagram of the first embodiment of FIG. 1, and a value detected by the power supply voltage detector 24 is read by a motor constant calculation unit 5B. Components in FIG. 6 denoted by the same reference numerals as in FIG. 1 are the same as those of FIG. 1. The second embodiment is different from the first embodiment only in regard to an operation of the motor constant calculation unit 5B, and other operations are the same as those of the first embodiment.

Figure 7:
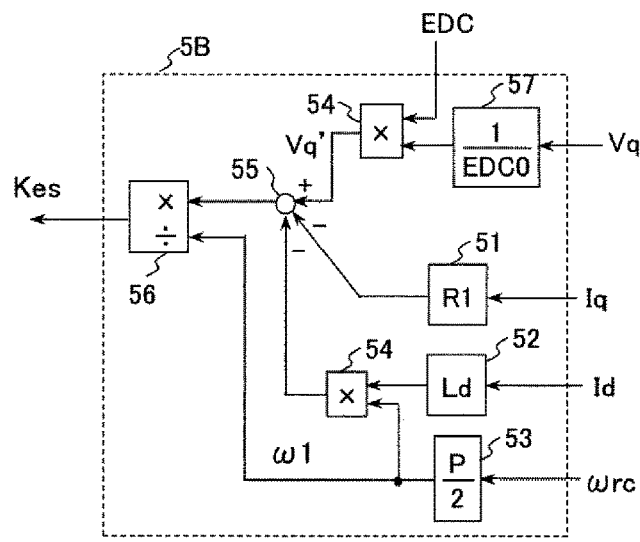
FIG. 7 is a view illustrating a motor constant calculation unit according to the second embodiment.

FIG. 7 illustrates a configuration block of the motor constant calculation unit 5B. Although FIG. 7 illustrates almost the same configuration as the configuration of the motor constant calculation unit 5 of FIG. 2, FIG. 7 is different from FIG. 2 in the regard that a power supply voltage detection value EDC of an inverter is input and a value of Vq is modified. In FIG. 7, a DC voltage value EDC is multiplied to Vq after passing through a DC voltage setting value gain 57, thereby modifying the value of Vq. That is, correction of Vq in an expression of Kes using Equation (4) is performed as below.

[Math 6]

$$V'_q = \frac{EDC}{EDC\,0} V_q \qquad \text{Equation (6)}$$

Here, EDC0 is a set value (fixed value) for the power supply voltage EDC.

It is necessary that Vq used in Kes calculation in Equation (4) is a q-axis voltage actually applied to the PM motor 4. However, in a case where the power supply voltage EDC of the inverter 2 varies, Vq generated in the controller 1 does not necessarily coincide with the q-axis voltage actually applied to the motor, and thus the correction needs to be performed.

When the correction of Vq is performed according to Equation (6), even in a case where the power supply voltage varies, abnormality detection can be performed with high precision.

Third Embodiment

Next, an AC electric motor control device according to a third embodiment of the present invention will be described with reference to FIGS. 8 to 10.

In the first and second embodiments described above, an abnormality in rotational speed of the PM motor 4 can be accurately detected by calculating a motor constant. However, in a system using the PM motor 4, an abnormality is caused by various factors, in addition to the abnormality in rotational speed. For example, in a case where an ambient temperature of the motor is increased, a rotor temperature of the PM motor is increased, and irreversible demagnetization occurs, or the like, rotational pulsation and noise caused by the rotational pulsation are generated.

In the first and second embodiments, it is possible to detect an apparent abnormality such as stop due to step-out. However, it is difficult to detect vibration of the device, a sign of irreversible demagnetization of a permanent magnet attached to a rotor, and the like.

According to the third embodiment of the present invention, an electric motor drive system with an abnormality detection function for solving the problems described above is provided.

Figure 8:
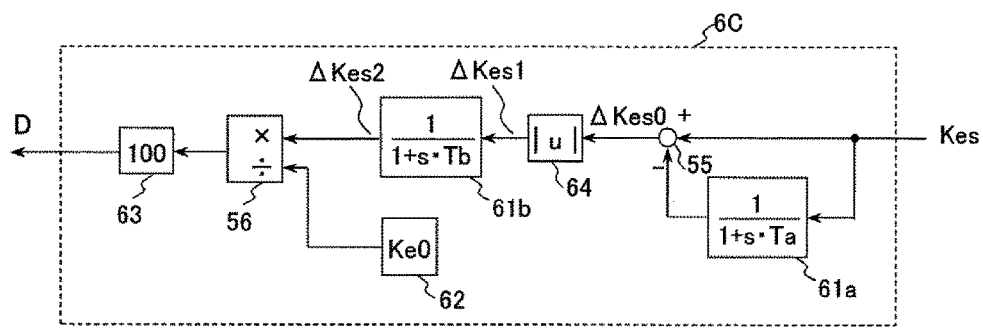
FIG. 8 is a view illustrating a configuration of an analyzer according to a third embodiment.
Figure 9:
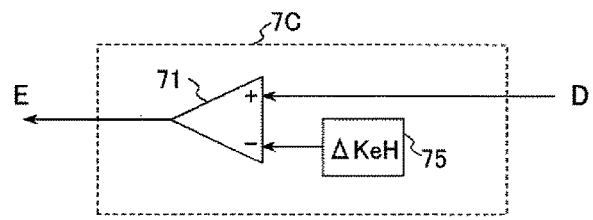
FIG. 9 is a view illustrating a configuration of an abnormality detector according to the third embodiment.
Figure 10A:
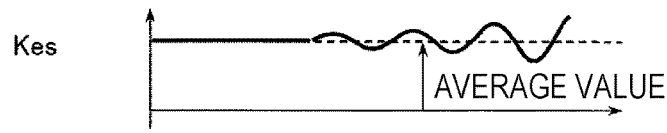
FIGS. 10A to 10E are waveform views for describing an operation waveform of each component according to the third embodiment.
Figure 10B:
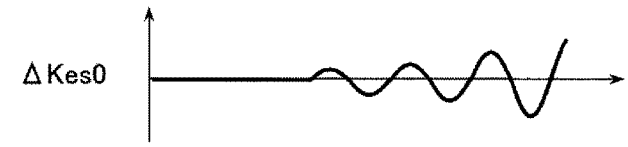
Figure 10C:
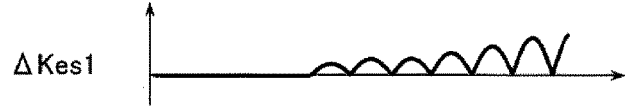
Figure 10D:
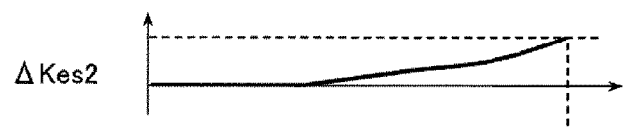
Figure 10E:
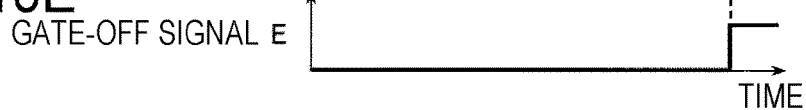

FIGS. 8 and 9 are configuration block diagrams of an analyzer 6C and an abnormality detector 7C according to the third embodiment of the present invention, respectively. The analyzer 6C and the abnormality detector 7C are used instead of the analyzer 6 and the abnormality detector 7 in FIG. 1 (or FIG. 6) and can be configured according to the third embodiment.

The analyzer 6C is a block which extracts a vibration component of Kes calculated by the motor constant calculation unit 5. For example, the vibration component is included in a Kes calculation result in a case where abnormality such as vibration occurs in a load of a motor, a case where demagnetization occurs in a portion of a permanent magnet of a rotor, or the like. In the present embodiment, an abnormal state is detected by extracting the vibration component.

The analyzer 6C is constituted by a primary delay filter 61a of a time constant Ta, an absolute value calculation unit 64 which calculates an absolute value of an input, a primary delay filter 61b of a time constant Tb, a Ke0 setter 62 which imparts a reference value Ke0 of a power generation constant Ke, an adder 55, a divider 56, and a gain 63.

It is assumed that Kes calculated by the motor constant calculation unit 5 includes a pulsation component due to abnormality in a load, or partial demagnetization. A value (that is, a value corresponding to an average value of Kes) obtained by eliminating the vibration component by using the primary delay filter of the time constant Ta is subtracted from Kes to obtain ΔKes0 as the pulsation component. This is illustrated in waveforms (a) and (b) of FIG. 10. Then, an absolute value of ΔKes0 is calculated by the absolute value calculation unit 63 to obtain ΔKes1 as a result (FIG. 10(c)). ΔKes1 shows a waveform like half-wave rectification; however, a smooth waveform ΔKes2 is obtained by making ΔKes1 pass through the primary delay filter 61b of the time constant Tb. ΔKes2 is a value increased as an amplitude of the variation component included in Kes is increased. Then, similarly to the first embodiment, ΔKes2 is divided by Ke0, and a variation is converted into a percentage and output as an abnormality signal D.

In the abnormality detector 7C, a reference value ΔKeH for a value of the abnormality signal D is set in an abnormality determination setter 75 in advance, and the comparator 71 compares the values with each other, such that a gate-off signal E is generated. A gate signal of an inverter is interrupted by the gate-off signal, such that it is possible to protect the device. Alternatively, it is also possible to inform a user of the device of a fact that a sign of abnormality is present as a warning before the interruption.

As described above, according to the third embodiment of the present invention, it is possible to detect an abnormal vibration of a motor drive device or partial demagnetization of a permanent magnet attached to a rotor, thereby making it possible to prevent heavy damage caused by continuous vibration, step-out and stop due to demagnetization, and the like. Further, the third embodiment of the present invention can be used together with the first or second embodiment, and in this case, it is possible to more certainly detect an abnormality including step-out due to a sudden change of a load.

Fourth Embodiment

Next, an AC electric motor control device according to a fourth embodiment of the present invention will be described with reference to FIGS. 11 to 13.

In the first to third embodiments of the present invention, an abnormality is detected by always calculating Kes and monitoring a value of Kes. However, like a case of drastic acceleration and deceleration driving of the PM motor 4, or the like, it is necessary to rapidly change a current by largely changing applied voltages Vd and Vq, and thus there is a possibility that the value of Kes largely varies at the same time. In order to prevent such a problem, for example, it is necessary to increase a time constant of a filter (for example, the filter 61 of FIG. 3) through which the Kes passes so that Kes is not affected by some variation. However, when the time constant of the filter is excessively increased, a long time is required for abnormality detection, and thus there is a possibility of causing a serious accident.

The fourth embodiment of the present invention is to solve the problem described above.

Figure 11:
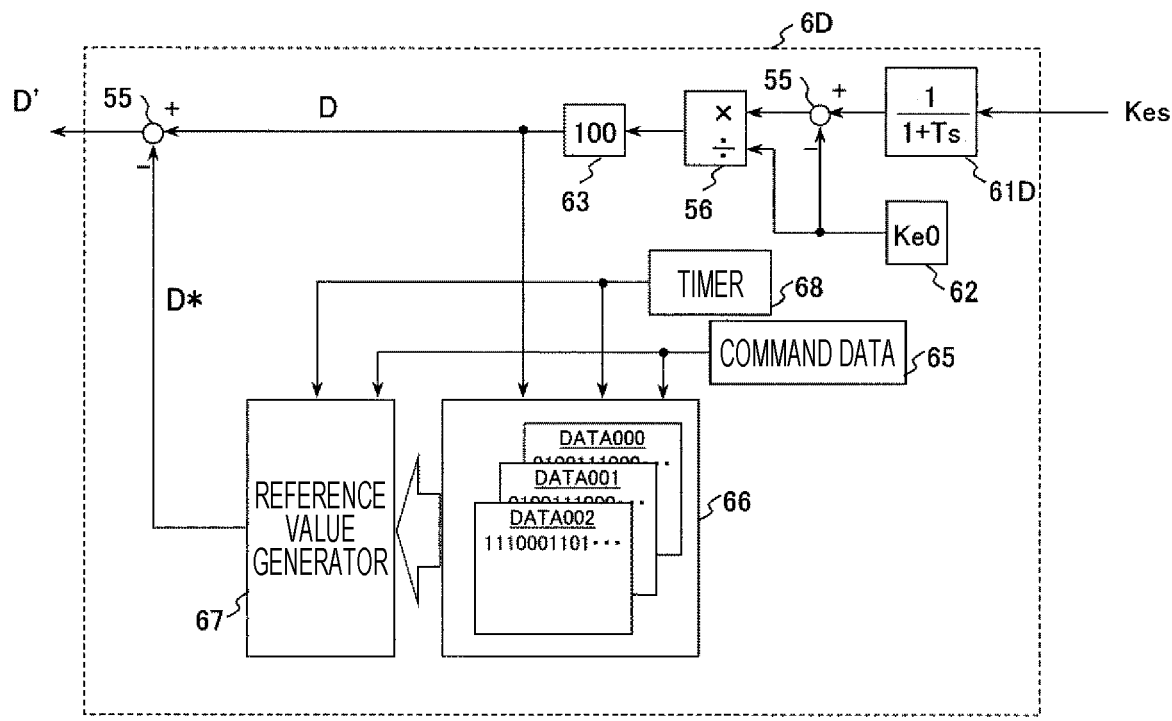
FIG. 11 is a view illustrating a configuration of an analyzer according to a fourth embodiment.
Figure 12:
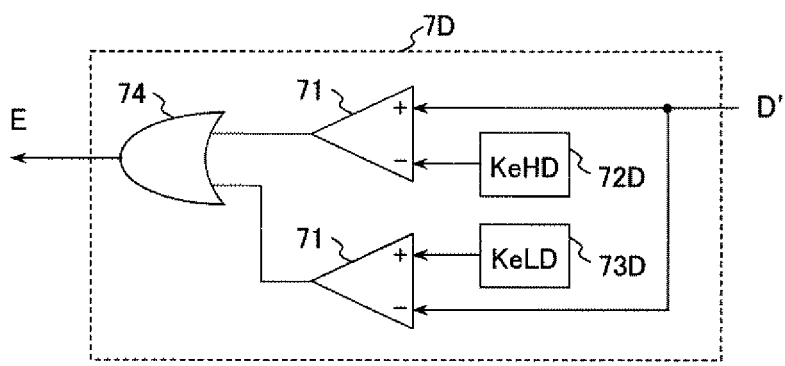
FIG. 12 is a view illustrating a configuration of an abnormality detector according to the fourth embodiment.

In the fourth embodiment of the present invention, an analyzer 6D illustrated in FIG. 11 and an abnormality detector 7D illustrated in FIG. 12 can be used instead of the analyzer 6 and the abnormality detector 7 according to the first and second embodiments.

In FIG. 11, components denoted by reference numerals 55, 56, 62, and 63 are the same as those according to the embodiments described above. For the filter 61D through which Kes passes, a time constant which is significantly smaller than the time constant T of the filter 61 of FIG. 3 can be set. Further, the analyzer 6D is constituted by a timer 68 for generating time data, a command data generator 65 which stores a speed command, a current command, and the like, a data storage 66 which stores an abnormality signal D, time data from the timer 68 at that time, and a command signal of the command data generator 65, and a reference data generator 67 which generates a reference value D* of the abnormality signal on the basis of data stored in the data storage 66.

The abnormality detector 7D illustrated in FIG. 12 has the same configuration as that of the abnormality detector 7 of FIG. 4, and an abnormality determination upper limit setter 72D and an abnormality determination lower limit setter 73D are different from each other only in regard to each setting value.

Next, an operation according to the fourth embodiment of the present invention will be described with reference to FIGS. 11 to 13.

When the PM motor 4 performs an acceleration and deceleration operation with high responsiveness, an applied voltage or a motor current largely varies, and thus a value of Kes calculated by a motor constant calculation unit 5 is affected and largely varies accordingly. In order to prevent this situation from being regarded as "abnormal", a time constant of the filter 61 in FIG. 11 may be increased. However, abnormality detection is delayed.

Therefore, a Kes calculation result at the time of acceleration and deceleration of the motor is stored in the data storage 66 as a database in advance. A command pattern of the PM motor 4 is somewhat limited depending on conditions, and can be stored as time series data. A Kes calculation result at this time is also stored at the same time, such that a signal D* as a reference is generated. D* coincides with a value of D in a normal state.

FIG. 13 illustrates an example of an operation waveform according to the fourth embodiment. It is assumed that a rotational speed ωr of the PM motor 4 has a pattern illustrated in FIG. 13(a). In this case, the abnormality signal D is transitional due to a transition phenomenon at the time of starting ("point A" in FIG. 13) or end of acceleration ("point B in FIG. 13"), but reaches an abnormality determination upper limit KeH or an abnormality determination lower limit KeL, such that there is a possibility that misdetection of an "abnormality" occurs. In order to prevent this, a change of the abnormality signal D in a normal state is stored in the data storage in advance, and is generated as a reference value D* by the reference data generator 67. A difference between the reference value D* and the abnormality signal D is obtained and is regarded as a new abnormality signal D'. As a result, transitional variation of D is canceled. In a case where a step-out phenomenon actually occurs ("point C" in FIG. 13), the abnormality signal D' reaches a determination value and it can be determined that "abnormality" occurs.

Data at the time of normal operation may be learned and stored in the data storage 66 in advance, and data may be accumulated by repeating an actual operation. Further, also in the reference value generator 67, an average value of past data is used, which is easy. However, the reference value D* can also be generated by introducing machine learning.

As described above, according to the fourth embodiment of the present invention, even in a case where the motor drive device is driven with high responsiveness, it is possible to implement abnormality detection without an erroneous operation.

Fifth Embodiment

Next, an AC electric motor control device according to a fifth embodiment of the present invention will be described with reference to FIG. 14.

In the fourth embodiment, abnormality detection is certainly performed by using stored values of command data or time series data. In this case, however, a large amount of data is required, and thus there is a possibility that a size of the device used in a cheap electric motor drive system is increased, which is problematic.

In the fifth embodiment of the present invention, "active and reactive power" different from command data or time data is used as data, such that an amount of stored data is decreased.

Figure 14:
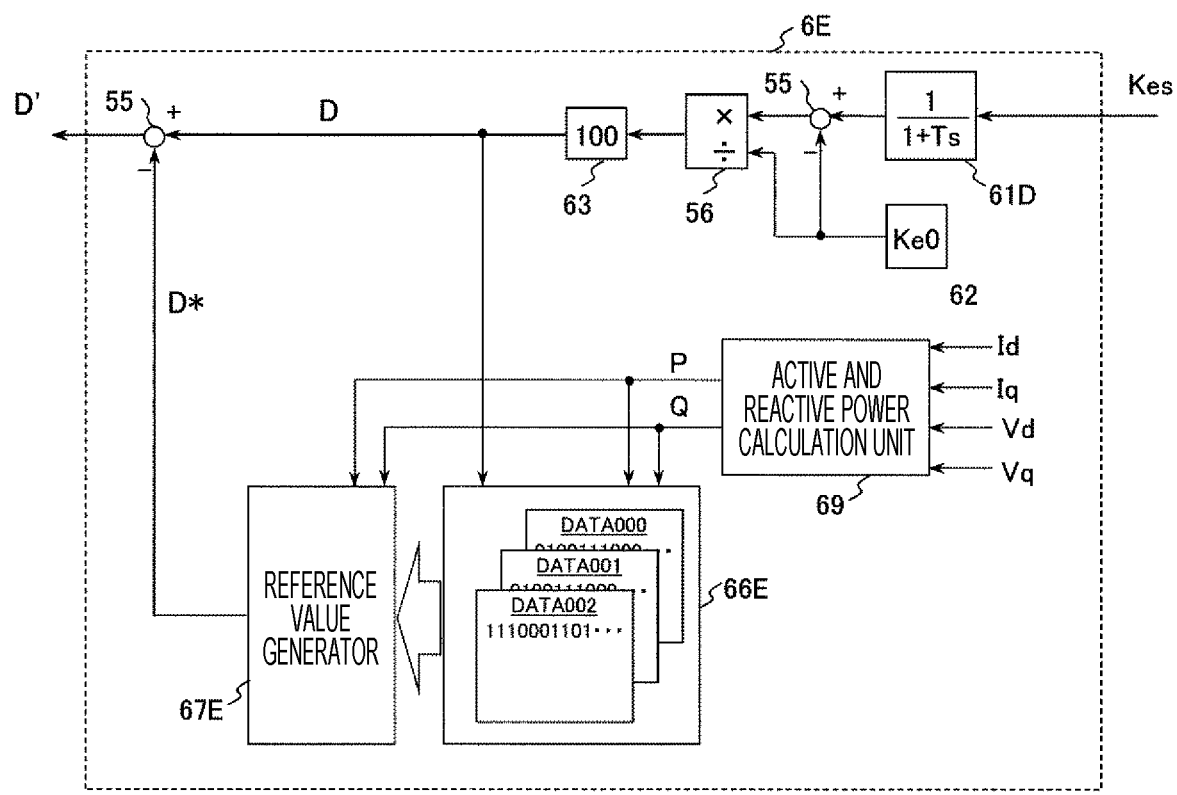
FIG. 14 is a view illustrating a configuration of an analyzer according to a fifth embodiment.

The fifth embodiment can be implemented by using an analyzer 6E illustrated in FIG. 14 instead of the analyzer 6D according to the fourth embodiment. In FIG. 14, components denoted by reference numerals 55, 56, 61D, 62, and 63 are the same as those according to the embodiments described above. In addition, an active and reactive power calculation unit 69, a data storage 66E, and a reference value generator 67E are newly included.

As described in the step-out detection method proposed in the past, it is known that a reactive current component is increased at the time of step-out, and abnormality caused by step-out has a strong correlation with power variation. In this regard, active power and reactive power are instantaneously calculated, and are stored as data simultaneously with Kes as a calculation value of a motor constant, such that a range of values of Kes in a normal state is stored as a database in the data storage 66E.

Active power P and reactive power Q can be calculated on the basis of Equation (7) and Equation (8).

[Math 7]

$$P = I_d V_d + I_q V_q \qquad \text{Equation (7)}$$

[Math 8]

$$Q = -I_d V_q + I_q V_d \qquad \text{Equation (8)}$$

The active and reactive power calculation unit 69 performs calculation of Equation (7) and Equation (8), and an abnormality signal D is stored as data in the data storage 66E. In this case, the command pattern or time data as in the fourth embodiment are unnecessary, and thus an amount of data can be largely decreased.

The reference value generator 67E determines an abnormality signal D* as a reference on the basis of values of the active power P and the reactive power Q, and generates a new abnormality signal D' on the basis of a difference between the abnormality signal D and the abnormality signal D*. Then, abnormality detection can be performed by appropriately setting an abnormality determination level.

Further, although an example in which both of active power and reactive power are stored as data has been described, the abnormality detection can also be performed by using only one of the active power and the reactive power depending on conditions.

As described above, according to the fifth embodiment of the present invention, even in a case where the motor drive device is driven with high responsiveness, it is possible to implement abnormality detection by using a small amount of data without an erroneous operation.

Sixth Embodiment

Next, an AC electric motor control device according to a sixth embodiment of the present invention will be described with reference to FIGS. 15 to 17.

In the embodiments described above, the method of detecting abnormality by back-calculating a power generation constant Ke as a motor constant has been described. In this case, however, there is a possibility that the power generation constant itself of the motor varies. What is most worrisome is that when an ambient temperature is changed, the power generation constant is also changed depending on the temperature, and thus it is difficult to distinguish abnormality of the device and variation due to the temperature from each other.

In order to distinguish the kinds of abnormalities, in the sixth embodiment of the present invention, a winding resistance value R1 as the motor constant is back-calculated at the same time. The winding resistance R1 is a value varying depending on the ambient temperature, and thus the value of R1 has a correlation with the value of Ke. Therefore, it is possible to distinguish the abnormality of the device and the abnormality caused by temperature variation from each other by simultaneously analyzing the value of R1 and the value of Ke and storing them as data.

Figure 15:
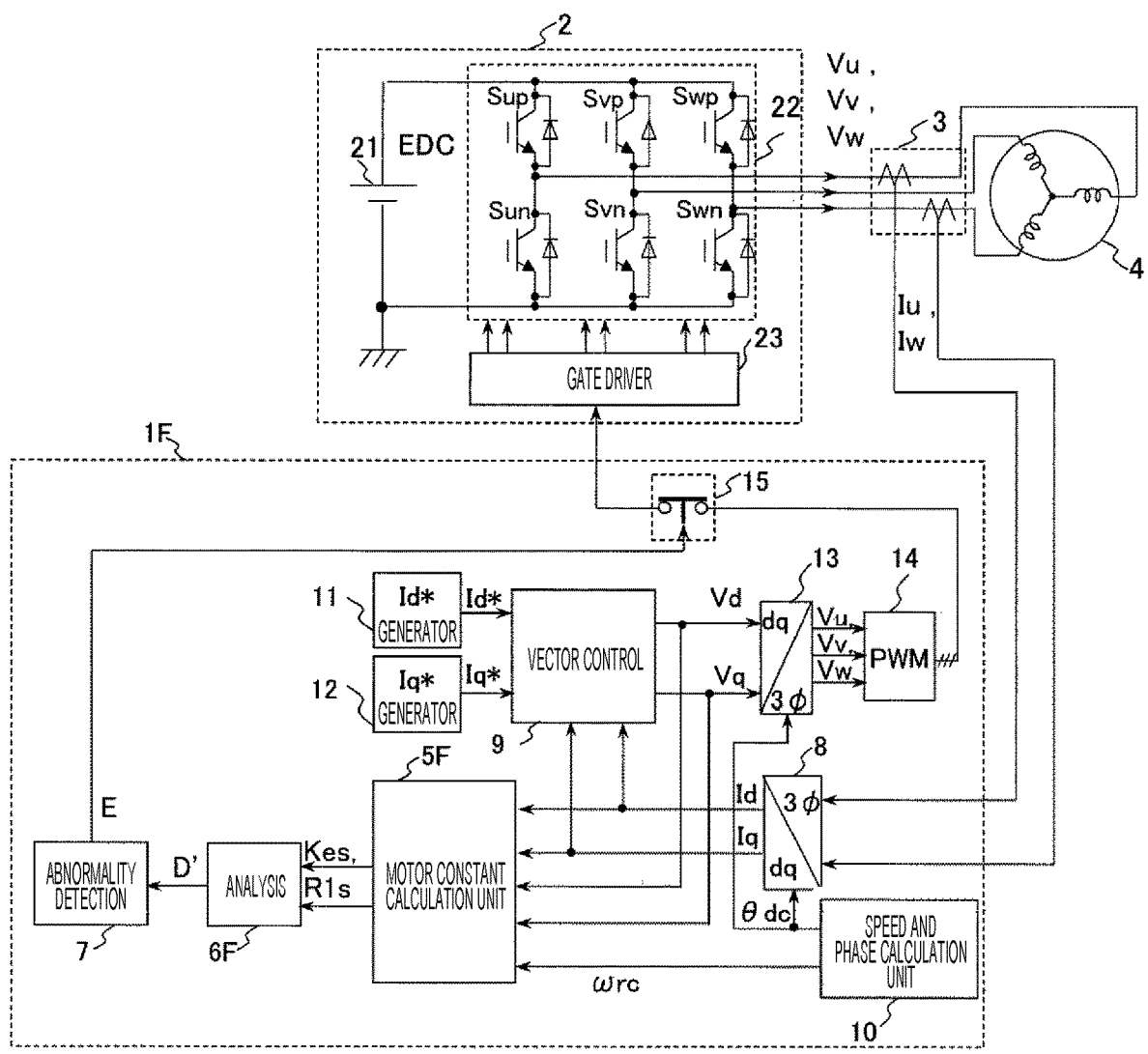
FIG. 15 is a view illustrating a configuration of an AC electric motor control device according to a sixth embodiment.
Figure 16:
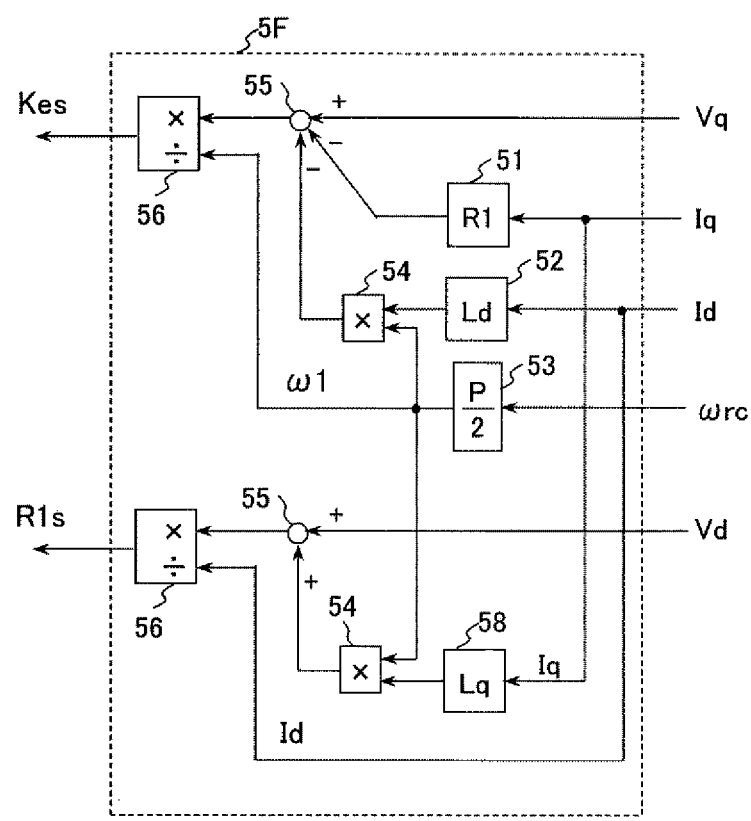
FIG. 16 is a view illustrating a motor constant calculation unit according to the sixth embodiment.

FIG. 15 is a configuration block diagram according to the sixth embodiment of the present invention. Although a configuration illustrated in FIG. 15 is almost the same as the configuration in FIG. 1 or 6, but the configuration in FIG. 15 and the configuration in FIG. 1 or 6 are different from each other in that the motor constant calculation unit and the analyzer described above are substituted with a motor constant calculation unit 5F and an analyzer 6F.

FIG. 6 illustrates a configuration block diagram of the motor constant calculation unit 5F. In comparison to the configuration in FIG. 2, a portion for calculating the winding resistance R1 is newly added. The winding resistance R1 can be obtained by Equation (9) modified from Equation (1).

[Math 9]

$$R_{1s} = \frac{V_d + \omega_1 L_q I_q}{I_d} \quad \text{Equation (9)}$$

However, a derivative term in Equation (1) is ignored. A lower portion of FIG. 16 is a block implementing Equation (9), and a q-axis inductance Lq setter 58 and the like are added.

Figure 17:
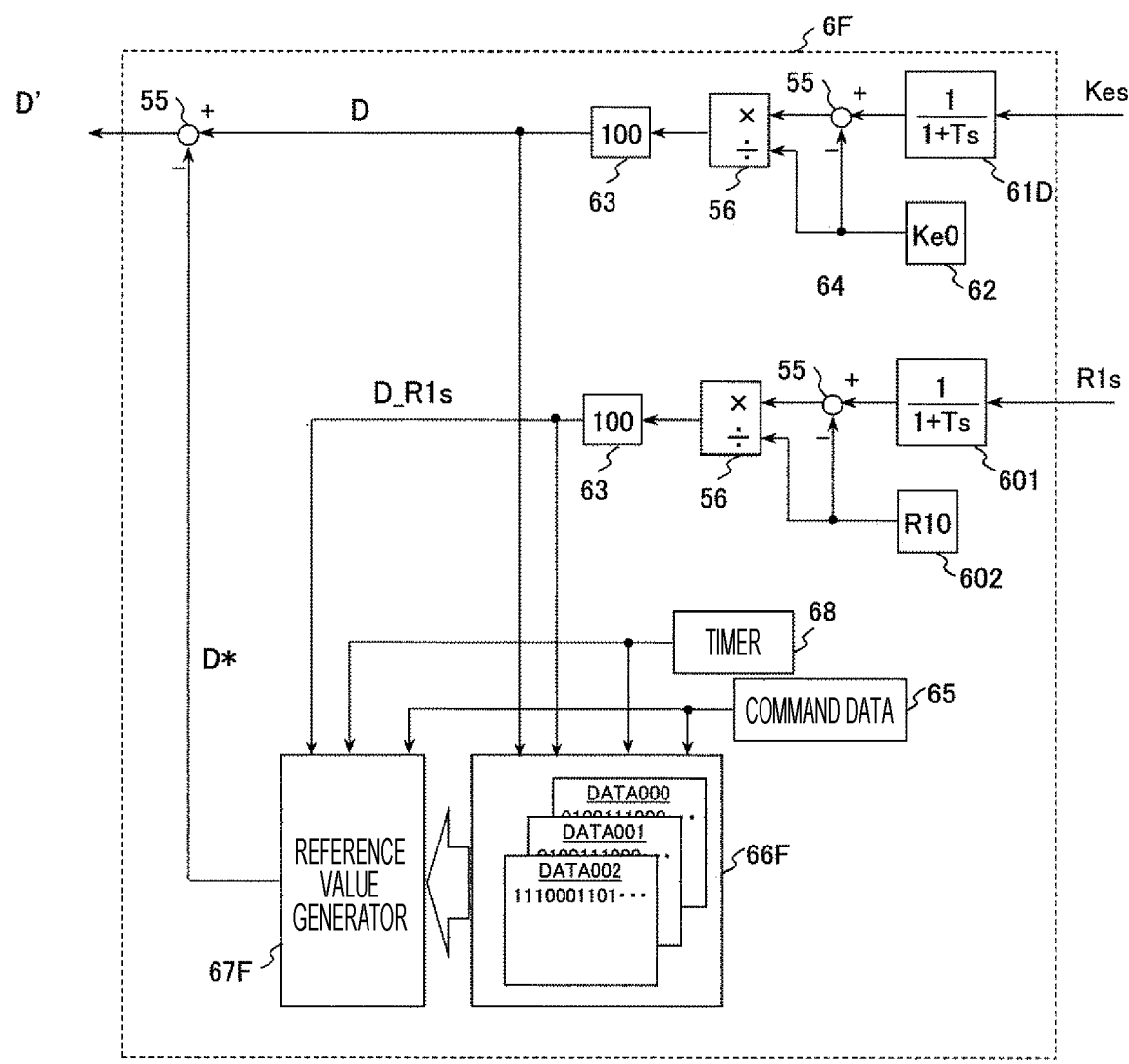
FIG. 17 is a view illustrating a configuration of an analyzer according to the sixth embodiment.

FIG. 17 is a configuration view of the analyzer 6F. In FIG. 17, an abnormality signal calculated on the basis of R1s is added as a new signal, in addition to those in the analyzer 6D of FIG. 11. In FIG. 17, a filter 601 is a filter element for a calculation value R1s of the winding resistance, and an R10 setter 602 imparting a reference value R10 of the winding resistance R1 is newly added. Here, similarly to a variation of the power generation constant, a variation of the winding resistance value R1s is converted into a percentage.

Further, the data storage 66F stores an abnormality signal D_R1s obtained on the basis of the calculation value of the winding resistance simultaneously with an abnormality signal D obtained on the basis of the calculation value of the power generation constant. By doing so, it is possible to associate variation of the winding resistance and variation of the power generation constant with each other.

The reference value generator 67F calculates and outputs D* as a reference value on the basis of the stored data.

In a case of variation of the power generation constant caused by an increase in temperature, the abnormality signal D_R1s of the winding resistance value is changed simultaneously. Therefore, the variation of the power generation constant can be associated with the abnormality signal D_R1s of the winding resistance value.

In addition, in a case where only temperature abnormality is monitored, determination can be made by storing the calculation value R1s of the winding resistance as time series data.

Further, as described in the third embodiment of the present invention, an abnormality of the motor drive device can be detected by extracting a variation of R1s, similarly to extracting a variation of Kes. In particular, under a condition in which an induced voltage (ω1·e) of the motor is decreased in an extremely low speed region, observing a change of R1s is more effective as sensitivity of abnormality detection is improved.

As described above, according to the sixth embodiment of the present invention, it is possible to distinguish constant variation depending on a temperature, and constant variation at the time of an occurrence of an abnormality from each other, and it is possible to implement abnormality detection with little loss of accuracy.

Seventh Embodiment

Figure 18:
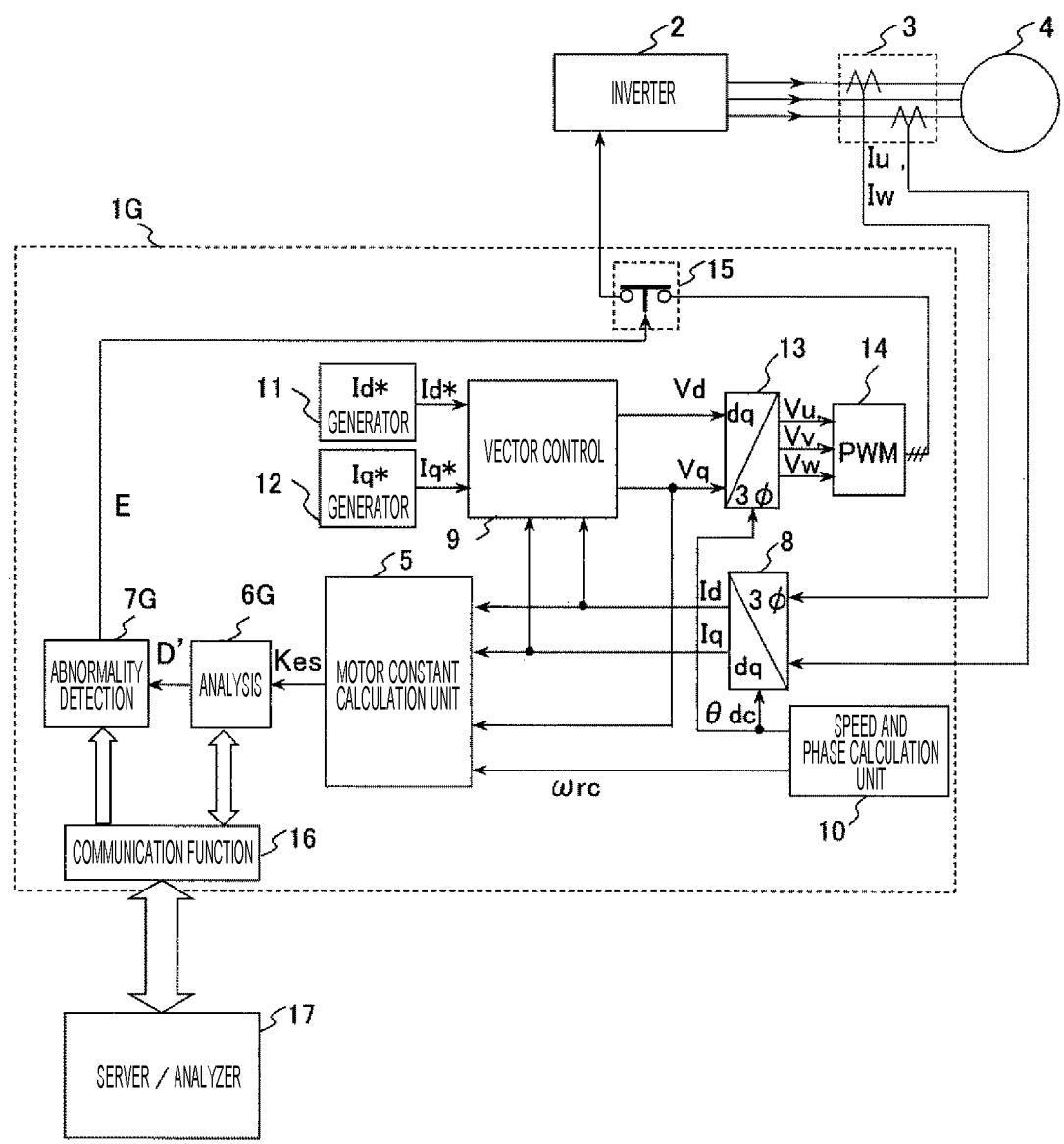
FIG. 18 is a view illustrating a configuration of an AC electric motor control device according to a seventh embodiment.

Next, an AC electric motor control device according to a seventh embodiment of the present invention will be described with reference to FIGS. 18 and 19. In FIG. 18, components denoted by reference numerals 2 to 5, and 8 to 15 are the same as the components denoted by the same reference numerals according to the embodiments described above. A difference between the seventh embodiment and the embodiments described above is that an analyzer 6G, an abnormality detector 7G, a communication function 16, and a data server and analyzer 17 are newly added.

In the fourth to sixth embodiments described above, the data storage which stores data at the time of a normal operation and the reference data generator are installed in the controller. However, as an operation range of the motor drive device is wide and the number of driving conditions is increased, data to be stored are increased, and analysis of the data becomes difficult accordingly.

In the seventh embodiment of the present invention, storing of data and analysis of the data are performed externally by using the communication function 16.

Figure 19:
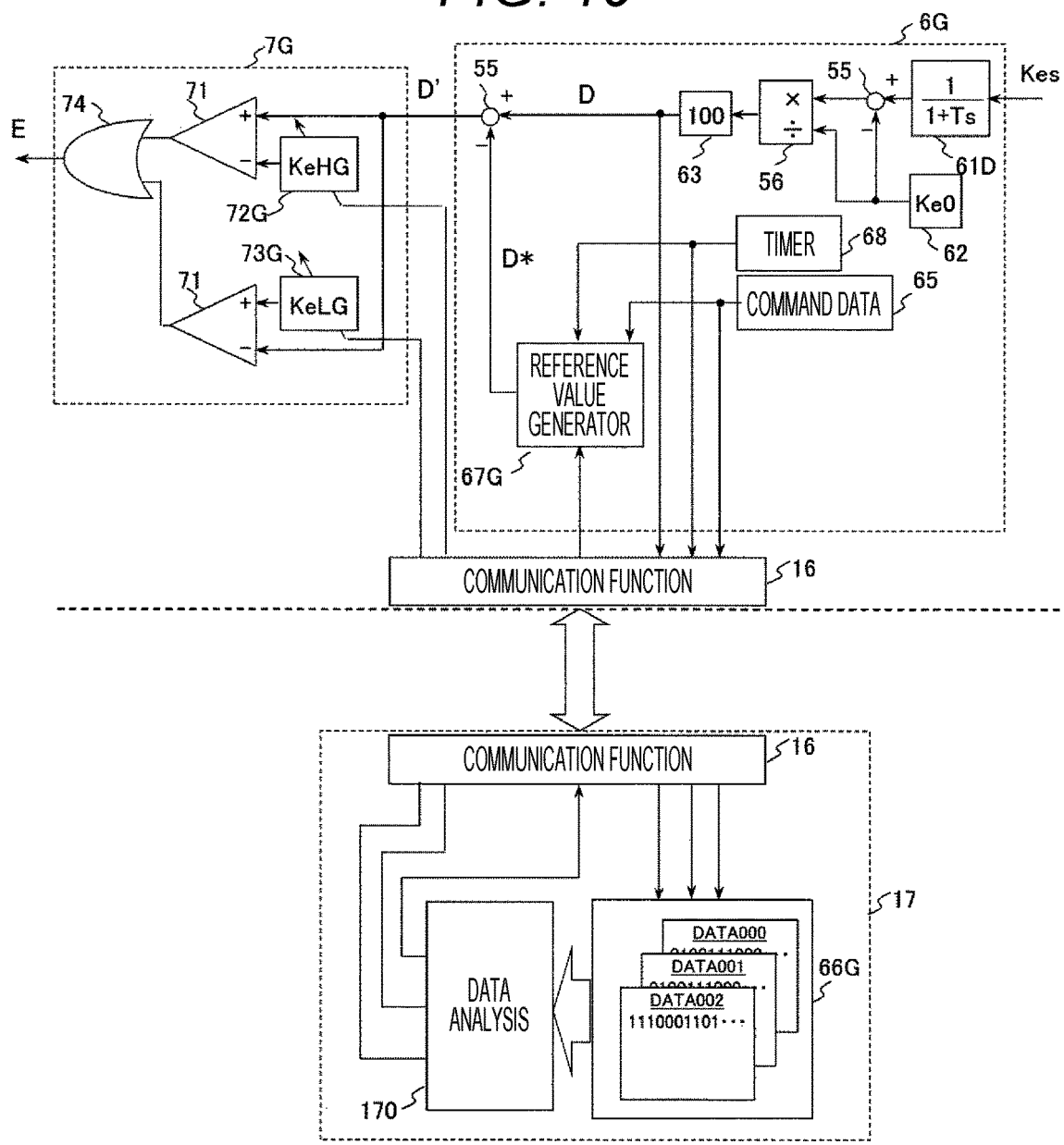
FIG. 19 is a view illustrating configurations of an analyzer, an abnormality detector, and a data server and analyzer according to the seventh embodiment.

FIG. 19 is a detail view of the analyzer 6G, the abnormality detector 7G, the communication function 16, and the data server and analyzer 17 illustrated in FIG. 18. In FIG. 19, components denoted by reference numerals 55, 56, 61D, 62, 63, 65, 68, 71, and 74 are the same as the components denoted by the same reference numerals described above. An operation of the analyzer 6G is similar to that in the fourth embodiment of the present invention. However, obtained data are stored in a data storage 66G of the external data server and analyzer 17 through the communication function 16.

A data storage amount in the data server and analyzer 17 is much larger than the amount of data in the fourth to sixth embodiments. In addition, as for data analysis, a large amount of data is processed by using a high speed and high precision analysis algorithm in a data analyzer 170 in the data server and analyzer 17. An analysis result is reflected to a reference value generator 67G of the analyzer 6G.

The reference value generator 67G generates a reference value D* as a reference of an abnormality signal by a map or a function with values of a timer 68 and command date 65 as an input. The map or the function is modified through the communication function 16 depending on a result of the analysis performed by the data analyzer 170 of the data server and analyzer 17.

In addition, the abnormality detector 7G performs comparison among an abnormality signal D', an upper limit value KeHG of abnormality determination, and a lower limit value KeLG of the abnormality determination. At this time, it is also possible to modify the upper and lower limit values of the abnormality determination depending on the result of the analysis performed by the data server and analyzer 17. That is, it is possible to implement abnormality detection with higher precision by using the data server and analyzer 17 installed outside.

Further, utilization of the data server and analyzer can also be applied to, for example, the fifth and sixth embodiments of the present invention. In addition, as the communication function, a wired or wireless network or a serial communication function can be used.

As described above, according to the seventh embodiment of the present invention, it is possible to implement abnormality detection of the motor drive device with high precision and little loss of accuracy. The externally performed analysis is performed by using, for example, a machine learning function, such that it is possible to variously implement abnormality detection by utilizing a larger amount of data.

Eighth Embodiment

Figure 20:
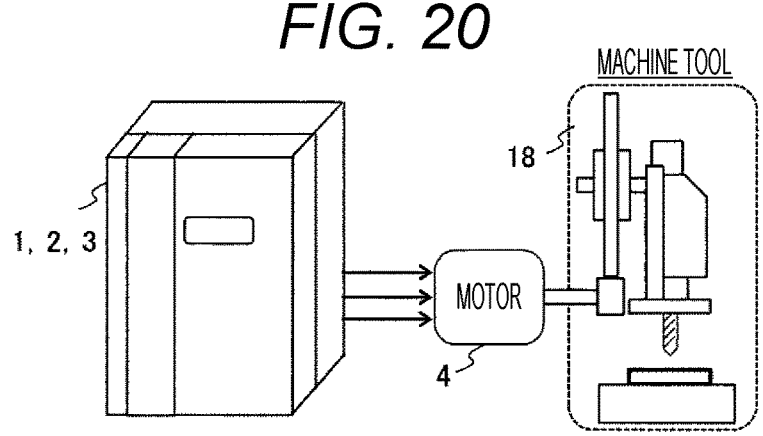
FIG. 20 is a configuration view illustrating an example of an application to a machine tool according to an eighth embodiment.
Figure 21:
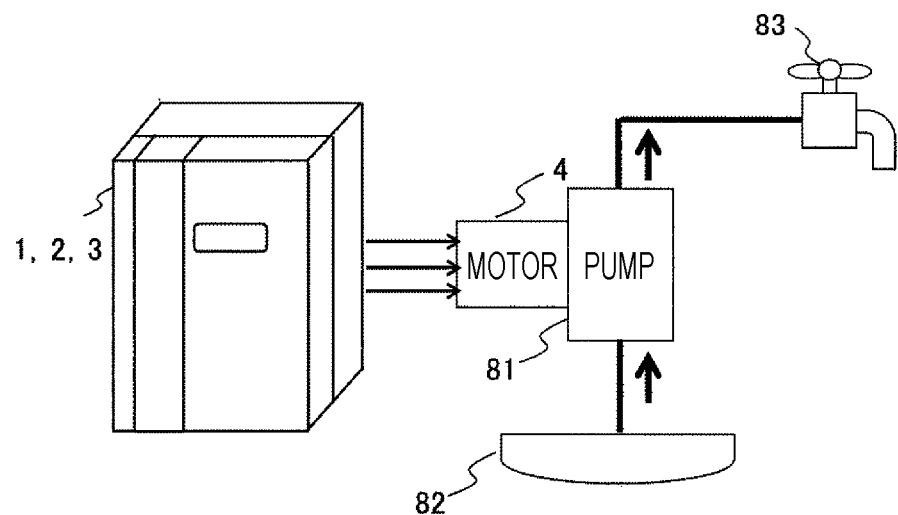
FIG. 21 is a configuration view illustrating an example of an application to a liquid pump system according to the eighth embodiment.
Figure 22:
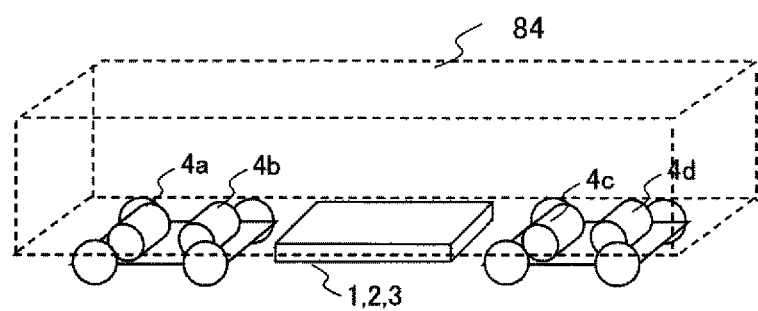
FIG. 22 is a configuration view illustrating an example of an application to a railcar according to the eighth embodiment.

FIGS. 20 to 22 illustrate an embodiment in which the AC electric motor drive device is applied.

FIG. 20 illustrates an example in which the AC electric motor drive device (a controller 1, an inverter 2, and a current detector 3 are accommodated in an integral case in the drawing) according to the present invention is applied to a machine tool 18. FIG. 20 illustrates a cutting machine for a material, as an example of the machine tool. When performing a cutting process by using the PM motor 4, for example, in a case where an edge of a drill is stuck in a material and stops, it is necessary to detect the situation as an abnormality and rapidly stop the motor. The AC electric motor drive device according to the present invention can provide such an abnormality detection function.

In addition, FIG. 21 illustrates an example in which the AC electric motor drive device according to the present invention is applied to a liquid pump system. FIG. 21 illustrates a system in which as a valve 83 is opened, a liquid stored in a liquid tank 82 is drawn up by using a pump 4 driven by the PM motor 4. In a case where abnormality such as stop of the motor due to a foreign material entering into the pump occurs, abnormality detection is smoothly performed by using the AC electric motor drive device according to the present invention.

In addition, in a case of a pump in a hydraulic system using, for example, oil as the liquid, viscosity of the oil is changed depending on a temperature. Therefore, an excessive load is applied to the motor depending on conditions, such that step-out occurs in some cases. Also in this case, it is possible to rapidly implement step-out detection.

FIG. 22 illustrates an example in which the AC electric motor drive device according to the present invention is applied to a railcar 84. In the railcar, it is necessary to drive a plurality of motors, and it is difficult to perform abnormality detection by attaching individual sensors to the motors. According to the present invention, the abnormality detection function can be embedded in the controller, thereby making it easy to monitor an operational state of the motor. In addition, as for maintenance of vehicle equipment, application by monitoring a motor constant is possible.

Hereinabove, the embodiments of the present invention have been described in detail. However, the present invention is not limited to the embodiments, and can be variously modified without departing from the gist of the present invention.

INDUSTRIAL APPLICABILITY

As described above, the present invention is a technology for constructing an AC electric motor control device and a drive system using the AC electric motor control device. The motor can be used for a rotational speed control of a machine tool, a spindle motor, a fan, a pump (hydraulic pump or water pump), a compressor, a cooling and heating device, or the like, and can be used as a motor for a conveyor, an elevator, an extruder, an electric vehicle, and a railcar.

REFERENCE SIGNS LIST

1 Controller
2 Inverter
21 DC power supply
22 Inverter main circuit
23 Gate driver
3 Current detector
4 PM motor
5 Motor constant calculation unit
6 Analyzer 6
7 Abnormality detector
8 dq converter
9 Vector control unit
10 Speed and position calculation unit
11 Id* generator
12 q* generator
13 dq inverter
14 Pulse width modulator (PWM)
15 Gate interrupter

The invention claimed is:

1. An alternating current (AC) electric motor control device consisting of a three-phase AC electric motor, an inverter driving the electric motor, and a controller controlling the electric motor by transmitting a pulse signal to the inverter, the AC electric motor control device comprising:
a means for calculating an electric motor constant by using at least one of a current, a voltage, and a rotational speed of the electric motor calculated inside the controller; and
a detection means for detecting an abnormal operation of the electric motor or an abnormal operation of a load device connected to the electric motor by analyzing the constant;
wherein the electric motor constant is an induced voltage constant of the AC electric motor, and the detection means detects the abnormal operation of the electric motor or the abnormal operation of the load device based on a pulsation component of the induced voltage constant.

2. The AC electric motor control device according to claim 1, wherein a means for detecting a power supply voltage of the inverter is included, and a variation of a value of the power supply voltage of the inverter is corrected.

3. The AC electric motor control device according to claim 1, wherein the detection means detects the abnormal operation of the electric motor or the abnormal operation of the load device based on an analysis of at least one of the induced voltage constant itself and a variation component of the induced voltage constant which are stored as time series data.

4. The AC electric motor control device according to claim 1, further comprising a means for calculating at least one of active power and reactive power in the controller, wherein the detection means detects the abnormal operation of the electric motor or the abnormal operation of the load device on the basis of the calculated electric motor constant and at least one of the active power and the reactive power.

5. The AC electric motor control device according to claim 1, wherein the electric motor constant includes a resistance value of the AC electric motor, and the detection means detects the abnormal operation of the electric motor or the abnormal operation of the load device based on an analysis of at least one of the resistance value itself and a variation component of the resistance value which are stored as time series data.

6. The AC electric motor control device according to claim 1, wherein the electric motor constant includes a resistance value and a power generation constant value of the AC electric motor, and the detection means detects the abnormal operation of the electric motor or the abnormal operation of the load device based on an analysis of at least one of the resistance value and the power generation constant value themselves, and variation components of the resistance value and the power generation constant value which are stored as time series data.

7. The AC electric motor control device according to claim 1, wherein the detection means detects the abnormal operation of the electric motor or the abnormal operation of the load device based on an analysis of at least one of the calculated electric motor constant and a variation of the electric motor constant as time series data stored in a data storage device connected to the controller through a communication means.

8. A machine tool system comprising:
the AC electric motor control device according to claim 1; and
a machine tool driven by the AC electric motor.

9. A pump system comprising:
the AC electric motor control device according to claim 1; and
a liquid pump driven by the AC electric motor.

10. A moving body system driven by the AC electric motor control device according to claim 1 and the AC electric motor.

* * * * *